United States Patent
Hayakawa

(10) Patent No.: US 7,858,188 B2
(45) Date of Patent: Dec. 28, 2010

(54) NON-STICK COATING COMPOSITION COMPRISING DIAMOND PARTICLES AND SUBSTRATE

(75) Inventor: Osamu Hayakawa, Shizuoka (JP)

(73) Assignee: Dupont-Mitsui Fluorochemicals Co Ltd

( * ) Notice: Subject to any disclaimer, the term of this patent is extended or adjusted under 35 U.S.C. 154(b) by 0 days.

(21) Appl. No.: 11/635,962

(22) Filed: Dec. 8, 2006

(65) Prior Publication Data

US 2007/0134488 A1      Jun. 14, 2007

Related U.S. Application Data

(60) Provisional application No. 60/750,210, filed on Dec. 14, 2005.

(51) Int. Cl.
    *B32B 9/00* (2006.01)
(52) U.S. Cl. .................................... 428/408
(58) Field of Classification Search ................ 428/408, 428/213, 701; 427/384
    See application file for complete search history.

(56) References Cited

U.S. PATENT DOCUMENTS

| 4,014,834 | A | 3/1977 | Concannon |
| 4,380,618 | A | 4/1983 | Khan et al. |
| 5,079,073 | A | 1/1992 | Tannenbaum |
| 5,171,404 | A | 12/1992 | Ellis et al. |
| 6,291,054 | B1 | 9/2001 | Thomas et al. |
| 6,592,977 | B2 | 7/2003 | Thomas et al. |
| 6,761,964 | B2 | 7/2004 | Tannenbaum |
| 2004/0116792 | A1 | 6/2004 | Nesbitt |

FOREIGN PATENT DOCUMENTS

| EP | 1048 751 B1 | 10/2004 |
| JP | 1996239682 A | 9/1996 |
| WO | WO 00/56537 | 9/2000 |

OTHER PUBLICATIONS

Kobayashi T et al, "Sliding part resin-based compsns. having wear resistance—comprises base resin mixt. of e.g. polyimide(s), polyester(s), PTFE filler and inorganic particles e.g. diamond, cubic carbide systems", DATABASE WPI, Section Ch, Week 199647, Derwent Publications Ltd., London, GB; AN 1996-472438, XP002438259.

*Primary Examiner*—David R Sample
*Assistant Examiner*—Daniel Miller

(57) ABSTRACT

A non-stick coating composition comprising diamond particles of relatively large size, i.e., greater than 1 micrometer, preferably greater than 10 micrometers, and a fluoropolymer, can be applied to a substrate. In addition, a structure comprising a substrate and an undercoat is applied to the substrate, where the undercoat comprises a primer layer comprising a heat resistant non-fluoropolymer polymer binder and diamond particles, and optionally a midcoat also comprising diamond particles.

12 Claims, No Drawings

NON-STICK COATING COMPOSITION COMPRISING DIAMOND PARTICLES AND SUBSTRATE

FIELD OF THE INVENTION

This invention is in the field of non-stick coating compositions and to substrates coated with such compositions. In particular, such compositions comprise diamond particles.

BACKGROUND OF THE INVENTION

It has long been desirable to achieve durable non-stick coatings on metal substrates that possess both excellent abrasion resistance and release. Non-stick coatings, especially for cookware, are well known in the art. Fluoropolymer resins are often used in these coatings, since these resins have a low surface energy as well as thermal and chemical resistance. Such polymers produce surfaces that release cooked food items, are cleaned easily, are stain resistant and are useful at cooking and baking temperatures. However, non-stick coatings based solely on fluoropolymer resins have poor adhesion to metal substrates. Thus, it has been a challenge to optimize a non-stick coating to achieve good adhesion to the substrate, good release of food particles in cooking applications, and good abrasion resistance to limit wear of the coating's surface.

Solutions to this problem, especially in the area of improved abrasion resistance, have been proposed in U.S. Pat. No. 6,291,054 B1 (Thomas et al); U.S. Pat. No. 6,592,977 (Thomas et al.); and U.S. Pat. No. 6,761,964 (Tannenbaum), which disclosures describe non-stick coating compositions and their applications to substrates to produce adherent, highly abrasion resistant coatings. These abrasion resistant coating compositions incorporate large ceramic particles, which can deflect abrasive forces away from the coating surface.

Abrasion resistance has also been addressed in WO 00/56537 (Gazo et al.), wherein non-stick coatings for use on aluminum substrates include a ceramic substrate incorporating abrasion resistant particles deposited on the aluminum surface with a fluoropolymer overcoat deposited over the ceramic substrate. Diamond particles are disclosed as a possible candidate for the abrasion resistant particles. The use of diamond particles in non-stick coatings on metal has been disclosed in EP 1 048 751 (Hort). In Hort, diamond particles which are known to have high thermal conductivity, are preferably incorporated into a hard base layer of aluminum oxide/titanium oxide, which is applied to the metal substrate prior to the application of the non-stick coating, to yield a very hard coating with good heat conductivity. Also disclosed is the incorporation of diamond particles in a layer of essentially fluorosilane, which is applied onto the hard base layer prior to the application of a cover layer of PTFE. Hort discloses that such a construction reduces the thermal barrier between the substrate and the non-stick coating and allows a more uniform temperature to be attained on the surface of the coated substrate.

Despite the teachings in recent disclosures that describe systems that attain increased abrasion resistance of non-stick coatings, there is still a desire to further improve the durability and wear resistance of coated substrates while maintaining good release.

SUMMARY OF THE INVENTION

It has been found that the use of diamond particles in a non-stick coating increases the abrasion resistance of the coating. Specifically, the selection and placement of the diamond particles in the layers of a multicoat system, the selection of particle size of the diamond particles and the combination of the diamond particles with ceramic particles of inorganic filler film hardeners in the coating composition can attain improvement in the degree of abrasion resistance of such coatings not recognized in prior art systems.

In particular, it has been found that the placement of diamond particles in the undercoat of a non-stick coating, specifically in the primer, the midcoat, or in both the primer and the midcoat, provides particularly good abrasion resistance.

Therefore, in accordance with the present invention, there is provided a structure comprising a substrate and a non-stick coating applied to the substrate. The coating comprises an undercoat and an overcoat, where the undercoat comprises a primer which includes a non-fluoropolymer containing binder adhered to the substrate. The undercoat includes diamond particles. The undercoat may further comprise a midcoat, where the midcoat includes diamond particles.

Further, in accordance with the present invention there is provided a non-stick composition comprising a liquid composition including a fluoropolymer and diamond particles, where the diamond particles have a particle size of greater than 1 micrometer, preferably greater than 10 micrometers. Such a composition is particularly useful as an undercoat composition.

Advantages in abrasion resistance have also been realized by putting diamond particles in the overcoat. Therefore, further in accordance with the present invention, there is provided a structure comprising a substrate and a non-stick coating applied to the substrate, said coating comprising an undercoat and an overcoat, wherein the overcoat comprises diamond particles, and the undercoat comprises ceramic particles of inorganic film hardener, wherein the ceramic particles of inorganic film hardener have a Knoop hardness of greater than 1200.

DETAILED DESCRIPTION OF THE PREFERRED EMBODIMENTS

In accordance with the present invention, a non-stick coating composition is adhered to a substrate. The substrate can be of any material that can withstand a bake temperature, such as metal and ceramics. The non-stick coating composition of the present invention achieves superior abrasion resistance by incorporating diamond particles into the coating composition in various arrangements in the undercoat or the overcoat. By "undercoat" it is meant any coating under the surface coating (overcoat) which may be a primer (or primer layer) or one or more intermediate (also referred to herein as midcoat) layers, or both. Specifically diamond particles are incorporated in the undercoat of a multilayer non stick system in either the primer or the midcoat, preferably in both the primer and the midcoat, or in the overcoat. In a preferred embodiment, where the diamond particles are in the undercoat, ceramic particles of inorganic film hardener are also included in the undercoat. In the embodiment where diamond particles are included in the overcoat, ceramic particles of inorganic film hardener, in particular silicon carbide, are included in the primer.

Diamond Particles

The addition of diamond particles, having a Knoop hardness in a range of 8000 to 8500 kg/mm$^2$, increases the surface hardness, and therefore the abrasion resistance, of the coating. Knoop hardness is a scale for describing the resistance of a material to indentation or scratching. Values for the hardness of minerals and ceramics are listed in the *Handbook of*

Chemistry, 77th Edition, 12-186,187 based on reference material from Shackelford and Alexander, *CRC Materials Science and Engineering Handbook*, CRC Press, Boca Raton Fla., 1991.

Diamond particles are a carbon crystalline material. The diamond particles used with the present invention are preferably monocrystalline. These particles have tightly controlled particle size, shape and surface properties. By tightly controlled particle size is meant that the particles have a tight mean particle size with a narrow distribution. Such diamond particles are typically used in polishing applications. Further preferred particles have a uniform, blocky shape that are tough and resist fracturing with good impact resistance. Preferred particles are also characterized by a clean diamond surface.

Preferably, the diamond particles have a mass median particle size (D50), which may be referred to herein simply as a median particle size, of greater than 1 micrometer, preferably greater than 10 micrometers. The particles range from about 1 to 60 micrometers, preferably range from about 10 to 60 micrometers and more preferably range from about 15 to 50 micrometers. Preferably 1 to 10%, by weight based on solids, of diamond particles are used in the coating composition of the present invention. Enough diamond particles should be used in the coating composition in order to provide the surface hardness characteristics desired, but not so many that it would be uneconomical to include the diamond particles.

Fluoropolymer

The coating composition of the present invention may further include a fluoropolymer. The fluoropolymer is a fluorocarbon resin. The coating composition may be used for each layer, meaning the primer, midcoat and overcoat. The use of a fluoropolymer in the primer is preferred, but is not necessary for the practice of the present invention. Generally, the fluoropolymer will comprise 10 to 45 wt % of the primer, at least 70 wt. % of the midcoat, and at least 90 wt % of the overcoat. All of these weight percentages are based on solids.

The fluoropolymer used for the non-stick coatings in this invention can be non melt-fabricable fluoropolymer with a melt viscosity of at least $1 \times 10^7$ Pa·s. One embodiment is polytetrafluoroethylene (PTFE) having a melt viscosity of at least $1 \times 10^8$ Pa·s at 380° C. with the highest heat stability among the fluoropolymer. Such PTFE can also contain a small amount of comonomer modifier which improves film-forming capability during baking (fusing), such as perfluoroolefin, notably hexafluoropropylene (HFP) or perfluoro (alkyl vinyl) ether, notably wherein the alkyl group contains 1 to 5 carbon atoms, with perfluoro(propyl vinyl ether) (PPVE) being preferred. The amount of such modifier will be insufficient to confer melt-fabricability to the PTFE, generally being no more than 0.5 mole %. The PTFE, also for simplicity, can have a single melt viscosity, usually at least $1 \times 10^9$ Pa·s, but a mixture of PTFEs' having different melt viscosities can be used to form the non-stick component.

The fluoropolymer can also be melt-fabricable fluoropolymer, either combined (blended) with the PTFE, or in place thereof. Examples of such melt-fabricable fluoropolymers include copolymers of TFE and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include perfluorinated monomers such as perfluoroolefins having 3 to 6 carbon atoms and perfluoro(alkyl vinyl ethers) (PAVE) wherein the alkyl group contains 1 to 5 carbon atoms, especially 1 to 3 carbon atoms. Especially preferred comonomers include hexafluoropropylene (HFP), perfluoro(ethyl vinyl ether) (PEVE), perfluoro(propyl vinyl ether) (PPVE) and perfluoro(methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The molecular weight of the melt-fabricable tetrafluoroethylene copolymers is unimportant except that it be sufficient to be film-forming and be able to sustain a molded shape so as to have integrity in the undercoat application. Typically, the melt viscosity will be at least $1 \times 10^2$ Pa·s and may range up to about 60 to $100 \times 10^3$ Pa·s as determined at 372° C. according to ASTM D-1238.

A preferred composition is a blend of non melt-fabricable fluoropolymer, with a melt viscosity in the range of $1 \times 10^7$ to $1 \times 10^{11}$ Pa·s, and melt fabricable fluoropolymer, with a viscosity in the range of $1'10^3$ to $1 \times 10^5$ Pa·s.

The fluoropolymer component is generally commercially available as a dispersion of the polymer in water, which is the preferred form for the composition of the invention for ease of application and environmental acceptability. By "dispersion" is meant that the fluoropolymer resin particles are stably dispersed in the aqueous medium, so that settling of the particles does not occur within the time when the dispersion will be used. This is achieved by the small size of the fluoropolymer particles, typically on the order of 0.2 micrometers, and the use of surfactant in the aqueous dispersion by the dispersion manufacturer. Such dispersions can be obtained directly by the process known as dispersion polymerization, optionally followed by concentration and/or further addition of surfactant.

Alternatively, the fluoropolymer component may be a fluoropolymer powder such as PTFE micropowder. In this case, typically, an organic liquid is used in order to achieve an intimate mixture of fluoropolymer and polymer binder. The organic liquid may be chosen because a binder dissolves in that particular liquid. If the binder is not dissolved within the liquid, then the binder can be finely divided and be dispersed with the fluoropolymer in the liquid. The resultant coating composition can comprise fluoropolymer dispersed in organic liquid and polymer binder, either dispersed in the liquid or dissolved in order to achieve the intimate mixture desired. The characteristics of the organic liquid will depend upon the identity of the polymer binder and whether a solution or dispersion thereof is desired. Examples of such liquids include N-methylpyrrolidone, butyrolactone, high boiling aromatic solvents, alcohols, and mixtures thereof, among others. The amount of the organic liquid will depend on the flow characteristics desired for the particular coating operation.

Polymer Binder

The coating composition of the present invention, when used for the primer, also contains a heat resistant, non-fluoropolymer containing polymer binder. The binder is composed of polymer which is film-forming upon heating to fusion and is also thermally stable. This component is well known in primer applications for non-stick finishes, for adhering the fluoropolymer-containing primer layer to substrates and for film-forming within and as part of a primer. The fluoropolymer by itself has little to no adhesion to a smooth substrate. The binder is generally non-fluorine containing and yet adheres to the fluoropolymer. Preferred binders are those that are soluble or solubilized in water or a mixture of water and organic solvent for the binder, which solvent is miscible with water. This solubility aids in the blending of the binder with the fluoropolymer component in the aqueous dispersion form.

An example of the binder component is polyamic acid salt which converts to polyamideimide (PAI) upon baking of the composition to form the primer. This binder is preferred because in the fully imidized form obtained by baking the polyamic acid salt, this binder has a continuous service temperature in excess of 250° C. The polyamic acid salt is generally available as polyamic acid having an inherent viscosity of at least 0.1 as measured as a 0.5 wt % solution in N,N-dimethylacetamide at 30° C. It is dissolved in a coalescing agent such as N-methylpyrrolidone, and a viscosity-reducing agent, such a furfuryl alcohol and reacted with tertiary amine, preferably triethylamine, to form the salt, which is soluble in water, as described in greater detail in U.S. Pat. No. 4,014,834 (Concannon). The resultant reaction medium containing the polyamic acid salt can then be blended with the fluoropolymer aqueous dispersion, and because the coalescing agent and viscosity-reducing agent are miscible in water, the blending produces a uniform coating composition. The blending can be achieved by simple mixing of the liquids together without using excess agitation so as to avoid coagulation of the fluoropolymer aqueous dispersion. Examples of other binders suitable for use with the present invention include polyamideimide (PAI), polyimide (PI), polyphenylene sulfide (PPS), polyether sulfone (PES), polyarylene-etherketone, polyetherimide, and poly(1,4(2,6-dimethylephenyl)oxide) commonly known as polyphenylene oxide (PPO). All of these resins are thermally stable at a temperature of at least 140° C. Polyethersulfone is an amorphous polymer having a sustained use temperature (thermal stability) of up to 190° C. and glass transition temperature of 220° C. Polyamideimide is thermally stable at temperatures of at least 250° C. and melts at temperatures of at least 290° C. Polyphenylene sulfide melts at 285° C. Polyaryleneether-ketones are thermally stable at temperatures of at least 250° C. and melt at temperatures of at least 300° C.

When the primer composition is applied as a liquid medium, wherein the liquid is water and/or organic solvent, the adhesion properties will manifest themselves upon drying and baking of the primer layer together with baking of the next-applied layers of fluoropolymer to form the non-stick coating on the substrate.

For simplicity, only one binder may be used to form the binder component of the primer used in the present invention. However, multiple binders are also contemplated for use in this invention, especially when certain end-use properties are desired, such as flexibility, hardness, or corrosion protection. Common combinations include PAI/PES, PAI/PPS and PES/PPS.

The proportion of fluoropolymer and binder, especially if the composition is used as a primer on a smooth substrate, is preferably in the weight ratio of 0.5 to 2.0:1. The weight ratios of fluoropolymer to binder disclosed herein are based on the weights of these components in the applied layer formed by baking the composition after application to its substrate. The baking drives off the volatile materials present in the coating composition, including the salt moiety of the polyamic acid salt as the imide bonds are formed during baking. For convenience, the weight of binder, when it is polyamic acid salt which is converted to polyamideimide by the baking step, can be taken as the weight of polyamic acid in the starting composition, whereby the weight ratio of fluoropolymer to binder can be determined from the amount of fluoropolymer and binder in the starting composition. When the composition of the invention is in the preferred aqueous dispersion form, these components will constitute about 5 to 50 wt % of the total dispersion.

Inorganic Film Hardener

The primer, the midcoat, or both, of the present invention may further comprise ceramic particles of an inorganic film hardener component. The term ceramic particle as used herein means that the particle is a sintered body which is a mixture of amorphous and crystalline phases. The inorganic film hardener component in the primer is one or more non-metallic filler type materials that are inert with respect to the other components of the composition and thermally stable at the eventual baking temperature which fuses the fluoropolymer and binder. The film hardener is water insoluble so that it is typically uniformly dispersible but not dissolved in the aqueous dispersion form of the composition of the invention. The ceramic particles of the film hardener of this invention preferably comprises large and small particles. The large ceramic particles have an average particle size of at least 14 micrometers, preferably at least 20 micrometers, more preferably at least 25 micrometers and even more preferably at least 35 micrometers.

The ceramic particles of inorganic film hardener preferably have a Knoop hardness of at least 1200, and more preferably of at least 1500. As noted above with respect to the diamond particles, Knoop hardness is a scale for describing the resistance of a material to indentation or scratching. The film hardener component of the primer imparts durability to the non-stick fluoropolymer composition applied as a coating on a substrate by deflecting abrasive forces applied to the coating surface and by resisting penetration of sharp objects that have penetrated the fluoropolymer overcoat.

The large ceramic particles of inorganic film hardener preferably have an aspect ratio of not greater than 2.5, and more preferably not greater than 1.5. By aspect ratio is meant a ratio of the longest diameter of a particle to the greatest distance of a dimension measured perpendicular to the longest diameter (major axis) of a particle. The aspect ratio is a means of quantifying a preferred particle shape and orientation. Particles with a high aspect ratio are flat or elongated, unlike the preferred particles of this invention, which are preferably more spherical and more closely approach an aspect ratio of 1.

Examples of inorganic filler film hardeners include inorganic oxides, carbides, borides and nitrides having a Knoop hardness of at least 1200. Preferred are inorganic oxides, nitrides, borides and carbides of zirconium, tantalum, titanium, tungsten, boron, aluminum and beryllium. Particularly preferred are silicon carbide and aluminum oxide. Typical Knoop hardness values for preferred inorganic compositions are: zirconia (1200); aluminum nitride (1225); beryllia (1300); zirconium nitride (1510); zirconium boride (1560); titanium nitride (1770); tantalum carbide (1800); tungsten carbide (1880); alumina (2025); zirconium carbide (2150); titanium carbide (2470); silicon carbide (2500); aluminum boride (2500); titanium boride (2850).

The primer preferably contains ceramic particles of inorganic film hardener of preferably large and small particles. The small ceramic particles of film hardener are preferably less than 10 micrometers in average particle size, more preferably less than 5 micrometers average particle size, and even more preferably in a range of 0.1 to 1.0 micrometers average particle size. Preferably the primer layer contains more than 30 wt % of ceramic particles of inorganic film hardener, and more preferably at least 35 wt %. Generally, the ceramic particles of inorganic film hardener will not exceed 60 wt % of the primer composition.

With respect to the midcoat, the inorganic film hardener can be any of the inorganic film hardeners described above with respect to the primer except that the particle size of the ceramic particles of film hardener in the midcoat will be less than the thickness of the midcoat so as to be entirely contained within such layer. Preferably the size of the ceramic particles of film hardener particles used in the midcoat are the small particle sizes preferred for the primer. Preferably the midcoat contains at least 8 wt % ceramic particles of inorganic film hardener, and more preferably 10 to 30 wt % thereof. The identity of the inorganic film hardener of the ceramic particles of film hardener in the primer and the midcoat can be the same or different, and the same is true for the identity of the large and small ceramic particles of film hardener in the primer.

Other Fillers

In addition to the large ceramic particles and small ceramic particles of inorganic filler film hardener, the non-stick coating compositions of this invention may contain other filler materials having a Knoop hardness value of less than 1200. Suitable additional fillers include glass flake, glass bead, glass fiber, aluminum or zirconium silicate, mica, metal flake, metal fiber, fine ceramic powders, silicon dioxide, barium sulfate, talc, etc.

Coating Application

The compositions used in the present invention can be applied to substrates by conventional means. Spray and roller applications forming each layer are the most convenient application methods, depending on the substrate being coated. Other well-known coating methods including dipping and coil coating are suitable. The midcoat composition can be applied by conventional methods to a primer prior to its drying. However, when the primer and midcoat compositions are aqueous dispersions, the midcoat composition can be applied to the primer preferably after drying to touch. The same is true for application of the overcoat composition to the midcoat. When the primer is made by applying the composition from an organic solvent, and the midcoat is applied from an aqueous medium, the primer should be dried so that all water-incompatible solvent is removed before application of the midcoat.

A resultant composite structure can be baked to fuse all the coatings at the same time to form a non-stick coating on the substrate. When the fluoropolymer is PTFE, a quick high bake temperature is preferred, e.g., for 5 min. at a temperature starting at 800° F. (427° C.) and rising to 815° F. (435° C.). When the fluoropolymer in the undercoat or the overcoat is a blend of PTFE and FEP, e.g., 50 to 70 wt % PTFE and 50 to 30 wt % FEP, the bake temperature may be reduced to 780° F. (415° C.), rising to 800° F. (427° C.) in 3 minutes (total bake time).

The coated substrate of the invention preferably has a primer that is no greater than 0.5 mils (13 micrometers) thick, more preferably 0.4 to 0.5 mils (10 to 13 micrometers) thick. Preferably the midcoat is thicker than the primer and is more preferably at least 50% thicker. Preferably the midcoat layer is 0.7 to 0.9 mils (18 to 23 micrometers) and the overcoat is 0.3 to 0.5 mils (8 to 12 micrometers) thick. The thickness of the primer described herein is measured by the eddy-current principle (ASTM B244) after baking. The eddy current values reflect an average of values across the substrate including the height of large particle and the depth of the valleys between particles. The primer thickness can also be measured by sectioning the pan and measuring the thickness from a micrograph obtained from a scanning electron microscope (SEM). By using SEM, a distinction can be made between the height of the large particles and the depth of the valley between particles. SEM values that report the primer thickness in the valley between particles are about 50% of reported eddy current values. The thickness of the midcoat and overcoat described herein are measured by the eddy-current principle.

The substrate of the present invention can be a metal or ceramic, examples of which include aluminum, anodized aluminum, cold-rolled steel, stainless steel, enamel, glass, and pyroceram. The substrate can be smooth, i.e. having a surface profile of less than 50 microinches (1.25 micrometers) as measured by a model RT 60 surface tester made by Alpa Co. of Milan, Italy, and needs to be clean. For pyroceram and some glass, improved results are obtained by activation of the substrate surface such as by a slight chemical etch, which is not visible to the naked eye, i.e., the surface is still smooth. The substrate can also be chemically treated with an adhesion agent such as a mist coat of polyamic acid salt, such as disclosed in U.S. Pat. No. 5,079,073 to Tannenbaum.

Products having non-stick finishes of the present invention include cookware, bakeware, rice cookers and inserts therefor, water pots, iron sole plates, conveyors, chutes, roll surfaces, cutting blades, etc.

Test Methods

SBAR Test:

A coated substrate is evaluated for abrasion resistance of the non-stick coatings using the SBAR test. This test is based on the British Standard Specification for cookware BS 7069: 1988 in which the coating system is subjected to an abrasive pad attached on a vertical arm with reciprocal horizontal movement. The apparatus performs an arm reciprocal horizontal movement of 100 mm±5 mm (4 in. +/−0.25 in.) from cylinder center at an average speed of ±10 m/min. The abrasive pad (3M Scotch-Brite 7447) is a random nylon web impregnated with phenolic resin and aluminum oxide and is secured to the cylinder and loaded to apply a total force of ±15 N (mass of arm+dead weight=4.5 kg or 10 lbs) on the coating. The test sample is prepared by coating a substrate as explained in the examples with drying and baking as specified. The coated substrate is washed with clear water and dried gently before testing. The test is run on dry and wet substrates as explained below.

The coated substrate is fixed on a fixed support and the loaded abrasive pad is applied on the non-stick surface. For running the procedure wet, the surface is lubricated by adding 50 ml of a dishwashing solution containing 5 g mild detergent in one liter (33 oz) of solution. The dry procedure is run without adding the detergent solution and all other procedures remain the same.

The specimen is kept stationary and the abrasive pad arm is moved backwards and forwards over a distance of 50 mm±2.5 mm (2 in. +/−0.1 in.) on both sides of the cylinder center point.

The abrasive pad is turned after 250 cycles and renewed after another 250 cycles. This procedure is continued until metal is visible and then the number of cycles for coating breakthrough is recorded. Coating breakthrough is the final point of the test.

Mechanical Tiger Paw Abrasion Test (MTP Abrasion Test)

A coated substrate is evaluated for abrasion resistance by continuously rotating three weighted ballpoint pen tips on the surface of the coated substrate while the substrate is heated and oscillated back and forth on a shaker table. The testing equipment used to perform the MTP Abrasion Test is shown and described in FIGS. 1, 2 and 3 of U.S. Pat. No. 6,761,964 to Tannenbaum, supra.

In operation, a fry pan with a coated aluminum substrate is washed in mild detergent to remove any dirt or oil. A test pan is placed on a hot plate with the aid of a removable centering rod temporarily installed in a central drive shaft. The centering rod acts a plumb line for pan placement on a surface of the hot plate after which the centering rod is removed. The test pan is subjected to the action of a tiger paw head. A tiger paw head is a disc with channels for housing three ballpoint pen refills that are free of damage prior to use. For each test, three new pen refills are installed in channels of the tiger paw head so that each refill extends downward ¾ inch (1.9 cm) from the bottom of a rotating disc. The tiger paw head is attached to a floating shaft that extends down from the drive disc attached to the drive shaft. The weight of the tiger paw head and floating shaft is regulated. In the equipment illustrated in U.S. Pat. No. 6,761,964, the weight is approximately 400 g. The combined weight of the floating shaft and washers (all approximately 115 g), the tiger paw head (approximately 279 g), and the ballpoint pen points (approximately 10 g) totals 404 g. The counterbalancing weight also totals approximately 400 g.

The hot plate is turned on and the test substrate (pan) is heated to a temperature of 400° F.+/−10° F. (204° C.+/−6° C.). When the pan reaches test temperature as determined by infrared temperature measurement on the substrate surface, the pen refills are lowered onto the pan and the equipment is activated to begin the shaker table oscillation and tiger paw head rotation. In this way, the testing equipment rotates the pens against and around the surface of the coated substrate. The speed of tiger paw head rotation is controlled at 30 rotations per minute. The speed of the shaker table is controlled for 30 back and forth oscillations per minute. A counter records the number of cycles completed. A timer counts down each 15-minute period of tiger paw rotation in a particular direction. Data is recorded at 15-minute intervals. The rotation of the tiger paw head is reversed after each 15-minute period. Periodically the pen refill points are inspected for build-up of coating. Built-up coating is removed as necessary.

Failure of the coating on the substrate (pan) is monitored by observing the oval-shaped paths that evolve as the points of the pen refills penetrate through the coating to reach the bare metal substrate. By heating the substrate, the time to failure is accelerated. The longer the time to failure, the better the durability of the non-stick coating.

At the end of each 15-minute cycle, the pan is evaluated according to the following MTP numerical ratings:

| | |
|---|---|
| 10 | New Pan |
| 9 | Grooves in coating |
| 8 | First nick to metal (for smooth substrates) |
| | Roughening of surface (for grit blasted substrates) |
| 7 | Lines to metal (outside and/or inside) |
| 6 | Oval beginning outside |
| 5 | Oval complete |

Accelerated Cooking With Tiger Paw Test (ATP)

A coated substrate such as a fry pan is evaluated for cooking performance and abrasion resistance by exposing the coating system to cycles of acid, salt and fat while the substrate is subjected to heat and the manual rotation of a tiger paw head. The test substrate is also subjected to detergent during multiple cleaning operations between food cycles. A scouring pad of synthetic fibers (Dobie) is used during the cleaning cycles.

For each test, coated pans plus a control pan are tested on a commercial gas stove top with sufficient burners to cook all pans simultaneously. The control pan is a standard pan coated with a known commercial cookware coating system for which the standard properties being judged have been predetermined many times. The temperature for the test is maintained at 374° F. (190° C.) to 401° F. (205° C.) as measured by a contact pyrometer on the substrate surface. The pans are methodically rotated among all the burners. The scratch portion of the test is conducted using a tiger paw head. Similar to the head described above for the MTP test, the tiger paw head is a disc with channels for housing three ballpoint pen refills that are free of damage prior to use. In advance of the test, five food items are prepared for cooking and a detergent solution is prepared:

Item 1: Hamburger—ground meat is formed into hamburger patties and salted heavily on one side.

Item 2: Onions—16 tablespoons of salt are added to a #10 can of onions.

Item 3: Tomato sauce—8 tablespoons of salt are added to 32 oz. tomato sauce and diluted to yield one gallon and then mixed thoroughly.

Item 4: Pancakes—Ready-mix pancake batter is prepared according to package instructions. 4 tablespoons of salt are added per 1 gallon of mix.

Item 5: Eggs—4 dozen eggs, 1 cup water, 4 tablespoons salt are mixed in a blender.

Detergent: 3 capfuls of liquid detergent in 3 gallons of hot water.

In operation, the test pans position are placed on the burners and heated to within the specified temperature range. The pans are subjected to five sequential cooking processes.

Cook 1: Two tablespoons of vegetable oil are placed in the center of the pan. A preformed hamburger patty salted heavily on one side is placed salt side down on the oil. The patty is cooked for 5 minutes. Then a lid is placed on the fry pan and the patty is cooked for five more minutes with the lid on. The patty is then turned over and the patty is allowed to cook for five more minutes with the lid on.

Cook 2: A half-cup of onions is added to each pan and allowed to simmer without a lid for five minutes. Water is added if necessary to keep the ingredients from burning.

Cook 3: Two cups (16 oz.) of prepared tomato sauce mixture is added to each pan and the lid is replaced. When the tomato sauce mixture has been added to all pans, the hamburger patty is removed and the mixture is allowed to simmer for 15 minutes. During this 15-minute simmer period the scratch abuse test is performed using the tiger paw head. The mixture is stirred in each pan with the tiger paw head in a circular pattern for 25 revolutions in a clockwise direction and for 25 more revolutions in a counter clockwise direction. At the conclusion of the 15-minute simmer period, the pans are removed from the burners, contents are emptied and each pan is washed thoroughly with a detergent solution. The pan is rinsed in clear water and wiped dry.

Cook 4: The pans are then returned to the burners in a rotated position and heated to within the specified temperature range. Pancake batter is poured into the center of the pan to form a pancake 5 to 6 inches in diameter. The pancake is allowed to cook until well done and then turned over to cook on the other side. All pancakes are removed. Each pan is quenched in hot water/detergent solution and washed thoroughly. The pans are rinsed and then dried.

Cook 5: The pans are again returned to the burners in a rotated position and heated to within the specified temperature range. In sequence each pan is covered with approximately 8 oz. of beaten egg mixture. The mixture is stirred in each pan with the tiger paw head in a circular pattern for 25 revolutions in a clockwise direction and for 25 more revolutions in a counter clockwise direction. When the eggs are completely cooked, the pans are removed from the burners, contents are emptied and each pan is washed thoroughly with a detergent solution. The pan is rinsed in clear water and wiped dry.

After every 5 cooks the pans are rated for scratch. During cook 4 any problems with release are noted. The pans are then returned to the burners in a rotated position and heated to within the specified temperature range. Testing is resumed beginning with cook 1 (hamburger). Testing continues until a pan is determined to have a scratch rating of 5 described below at which time testing stops.

Scratch (0 to 10): The scratch rating is determined by a visual comparison of pictures of standard test substrates at specified ratings of 10, 9, 7, 5. The rating of 10 is for a new pan and the rating of 5 signifies a pan with so much abrasion wear that the homemaker would discard the pan.

Mechanical Abrasion and Release Test (MAR)

A coated substrate such as a fry pan is evaluated for both abrasion resistance and release.

A coated substrate is evaluated for abrasion resistance of the non-stick coatings in modified SBAR test. The abrasive pad (3M Scotch-Brite 7447) is secured to the cylinder and loaded to apply a total force of ±5 N (mass of arm+dead weight=4.5 kg or 10 lbs) on the coating. The test is run on wet condition with the detergent solution. The abrasive pad is turned after 1,000 cycles and renewed after another 1,000 cycles. After a specified number of cycles, the arm is halted and the test pan is washed by water and dried. Then the coating film thickness is measured and a release test is performed at the center of the track formed by the abrasive pad. As described below, the release test is a means of determining the ability of the non-stick coating to release an egg. This procedure is continued until metal is visible. The film thickness is measured with a film thickness instrument described later. Abrasion is expressed by the loss of film thickness as a function of the number of abrasion cycles.

Release Test

The pan is heated to a range of 374° F. (190° C.) to 392° F. (200° C.) and maintained in this temperature range as measured by a contact pyrometer on the substrate surface throughout the testing. An egg is fried in an unseasoned pan. To conduct the test an egg is broken over the pan and cooked for 3 minutes. The egg is lifted with a spatula and the pan is tilted to allow for the egg to slide. The ease with which the egg slides is assessed. The pan is returned to the burner and the egg is turned over. The yolk of the egg is broken with a spatula and the egg is cooked for 2 more minutes. The egg is again lifted with a spatula and the ease with which the egg slides is determined based on the scale designated "release" described below.

Release (0 to 5): The release rating is determined by assessing how easily the egg slides and how much of the egg sticks to the pan.

| 5 | Excellent |
| 4 | Very good |
| 3 | Good |
| 2 | Fair |
| 1 | Severe |
| 0 | Very Severe |

AIHAT

A coated substrate such as a fry pan is subjected to a series of high temperature cooking cycles using common household metal cooking utensils (fork, spatula, whisk, knife). A description of the test is described in U.S. Pat. No. 5,250,356 (Batzar) column 3, lines 11-64. The test is a measure of mar and scratch from common cooking abuse.

Dried Film Thickness (DFT)

The baked coating thickness is measured with a film thickness instrument, e.g., Fisherscope, based on the eddy-current principle (ASTM B244).

Fluoropolymer PTFE dispersion: DuPont TFE fluoropolymer dispersion with a solids content of 59 to 61 wt % and RDPS of 170 to 210 nanometers. PTFE fluoropolymer dispersion grade 30, is available from the DuPont Company, Wilmington, Del.

FEP dispersion: TFE/HFP fluoropolymer dispersion with a solids content of 54.5 to 56.5 wt % and RDPS of 150 to 210 nanometers, the resin having an HFP content of 9.3 to 12.4 wt % and a melt flow rate of 11.8 to 21.3 g/10 min measured at 372° C. by the method of ASTM D-1238 modified as described in U.S. Pat. No. 4,380,618.

PFA dispersion: DuPont PFA fluoropolymer dispersion with a solids content of 58 to 62 wt % and RDPS of 185 to 245 nanometers, the resin having an PPVE content of 2.9 to 3.6 wt % and a melt flow rate of 1.3 to 2.7 g/10 min measured at 372° C. by the method of ASTM D-1238 modified as described in U.S. Pat. No. 4,380,618. PFA fluoropolymer dispersion grade 335, is available from the DuPont Company, Wilmington, Del.

Polymer Binder

PAI is Torlon® AI-10 poly(amide-imide) (Solvay advanced polymers), a solid resin (which can be reverted to polyamic salt) containing 6 to 8% of residual NMP.

Polyamic acid salt is generally available as polyamic acid having an inherent viscosity of at least 0.1 as measured as a 0.5 wt % solution in N,N-dimethylacetamide at 30° C. It is dissolved in a coalescing agent such as N-methyl pyrrolidone, and a viscosity reducing agent, such as furfuryl alcohol and reacted with tertiary amine, preferably triethyl amine to form the salt which is soluble in water, as described in greater detail in U.S. Pat. No. 4,014,834 (Concannon).

Diamond Particles

Synthetic mono-crystalline micronized diamond particles are used in a variety of sizes and mixtures. Various sizes which are used are:

60.24 micrometers median particle size
37.82 micrometers median particle size
28.93 micrometers median particle size
17.49 micrometers median particle size
8.61 micrometers median particle size
1.26 micrometers median particle size The particle size distribution and mass median particle size (d50) are measured by Microtrac-X100 laser diffraction & scattering particle size analyzer available from Microtrac Inc. PA, USA.

Inorganic Film Hardener

Silicon Carbide

Silicon carbide supplied by Elektroschmelzwerk Kempten GmbH (ESK), Munich, Germany is used.

P 600=25.8±1 micrometers average particle size

The average particle size is measured by sedimentation using FEPA-Standard-43-GB 1984R 1993 resp. ISO 8486 according to information provided by the supplier.

Aluminum Oxide

Aluminum oxide (small particles) are supplied by Aluminum Corporation of America—Grade SG A-16 with an average particle size 0.35 to 0.50 micrometers.

EXAMPLES

Example 1

A 3-coat non-stick system representative of the invention is sprayed onto test pans of smooth aluminum that have been treated only by washing to remove grease but not mechanically roughened. The aqueous dispersion compositions of the primer, midcoat and overcoat are listed in Tables 1, 2 and 3 respectively.

TABLE 1

Primer composition

| Diamond loading ratio | in dry film wt % | 0.0 | 2.9 | 5.7 |
|---|---|---|---|---|
|  | in dry film vol % | 0.0 | 2.0 | 4.0 |

| Ingredients | wt % | | |
|---|---|---|---|
| Carbon black | 0.31 | 0.31 | 0.31 |
| Ultramarin blue pigment | 1.76 | 1.75 | 1.73 |
| Aluminum oxide | 8.15 | 8.08 | 8.02 |
| Silicon carbide | 5.33 | 5.28 | 5.24 |
| Diamond particle | 0.00 | 0.84 | 1.68 |
| PTFE (solids in aqueous dispersion) | 4.19 | 4.16 | 4.12 |
| Amorphous silica | 0.95 | 0.94 | 0.93 |
| FEP (solids in aqueous dispersion) | 2.88 | 2.85 | 2.83 |
| Polyamide imide polymer | 4.65 | 4.61 | 4.57 |
| 4,4'-Methylenedianiline | 0.01 | 0.01 | 0.01 |
| Sodium naphthalenesulfonic acid | 0.18 | 0.17 | 0.17 |
| Hydroxypropyl cellulose | 0.02 | 0.02 | 0.02 |
| Ethoxylated acetylenic diols | 0.24 | 0.24 | 0.24 |
| Water | 62.47 | 61.94 | 61.42 |
| Triethanolamine | 0.01 | 0.01 | 0.01 |
| Octylphenolpolyethoxy surfactant | 0.53 | 0.52 | 0.52 |
| Diethylethanolamine | 0.66 | 0.65 | 0.64 |
| Triethylamine | 1.31 | 1.30 | 1.29 |
| Furfuryl alchohol | 3.58 | 3.55 | 3.52 |
| N-Methylpyrrolidone | 2.78 | 2.76 | 2.74 |
| Total | 100.00 | 100.00 | 100.00 |

TABLE 2

Midcoat Composition

| Diamond loading ratio | | | | |
|---|---|---|---|---|
| in dry film wt % | 0.0 | 1.6 | 3.1 | 6.0 |
| in dry film vol % | 0.0 | 1.0 | 2.0 | 4.0 |

| Ingredients | wt % | | | |
|---|---|---|---|---|
| Carbon black | 1.05 | 1.04 | 1.03 | 1.02 |
| Ultramarin blue pigment | 0.28 | 0.28 | 0.28 | 0.27 |
| Aluminum oxide | 6.56 | 6.52 | 6.47 | 6.39 |
| Mica/TiO2/Tin oxide | 0.73 | 0.73 | 0.72 | 0.71 |

TABLE 2-continued

Midcoat Composition

| Diamond particle | 0.00 | 0.68 | 1.33 | 2.63 |
|---|---|---|---|---|
| PTFE (solids in aqueous dispersion) | 28.39 | 28.20 | 28.01 | 27.64 |
| PFA (solids in aqueous dispersion) | 5.01 | 4.98 | 4.95 | 4.88 |
| Sodium aphthalenesulfonic acid | 0.20 | 0.20 | 0.20 | 0.20 |
| Hydroxypropyl cellulose | 0.02 | 0.02 | 0.02 | 0.02 |
| Cerium octoate | 0.49 | 0.49 | 0.48 | 0.48 |
| Acrylic polymer | 12.83 | 12.74 | 12.65 | 12.49 |
| Butylcarbitol | 2.04 | 2.02 | 2.01 | 1.98 |
| Oleic acid | 1.03 | 1.02 | 1.02 | 1.00 |
| Water | 32.38 | 32.16 | 31.94 | 31.52 |
| Triethanolamine | 3.91 | 3.88 | 3.85 | 3.80 |
| Aromatic hydrocarbon | 2.49 | 2.48 | 2.46 | 2.43 |
| Octylphenolpolyethoxy surfactant | 2.60 | 2.58 | 2.56 | 2.53 |
| Total | 100.00 | 100.00 | 100.00 | 100.00 |

TABLE 3

Overcoat Composition

| Diamond loading ratio | in dry film wt % | 0.0 | 3.3 |
|---|---|---|---|
|  | in dry film vol % | 0.0 | 2.0 |

| Ingredients | wt % | |
|---|---|---|
| Mica/TiO2/Tin oxide | 0.37 | 0.37 |
| PTFE (solids in aqueous dispersion) | 39.68 | 39.11 |
| PFA (solids in aqueous dispersion) | 2.09 | 2.06 |
| Diamond particle | 0.00 | 1.42 |
| Cerium octoate | 0.58 | 0.57 |
| Acrylic polymer | 12.93 | 12.74 |
| Butylcarbitol | 2.42 | 2.38 |
| Oleic acid | 1.22 | 1.21 |
| Water | 30.13 | 29.70 |
| Triethanolamine | 4.59 | 4.53 |
| Aromatic hydrocarbon | 2.96 | 2.92 |
| Octylphenolpolyethoxy surfactant | 3.03 | 2.99 |
| Total | 100.00 | 100.00 |

The primer is sprayed onto the aluminum substrate and dried at 150° F. (66° C.) for 5 minutes. The midcoat is then sprayed over the dried primer. The overcoat is applied (sprayed) wet on wet to the midcoat. The coating is forced air dried at 300° F. (149° C.) for 10 minutes and then cured at 800° F. (427° C.) for 5 minutes. The dried coating film thickness (DFT) for primer/midcoat/overcoat is determined by eddy current analysis to be 0.4 to 0.5 mils (10 to 13 micrometers)/0.7 to 0.9 mils (18 to 23 micrometers)/0.3 to 0.4 mils (7 to 10 micrometers).

The examples presented below show an abrasion resistance of the 3-coat system with varying amounts and sizes of diamond particles in the different placement of the coating. Test pans are subjected to SBAR wet and MTP to evaluate an abrasion resistance.

Diamond Particles in the Primer

Abrasion test results of a 3-coat system with diamond particles in the primer are shown in Table 4. The diamond particle size in the primer is varied in the range of 1 to 60 micrometers at the loading ratio of 2.9 wt % in the dry film. All particle sizes show some improvement over the control pan. With 38 micrometer diamond particles, SBAR wet performance is much improved at 14,250 cycles.

TABLE 4

Abrasion resistance of 3-coat system with diamond particles in the primer

|  | Example | | | | | | |
|---|---|---|---|---|---|---|---|
|  | 1-1 (control) | 1-2 | 1-3 | 1-4 | 1-5 | 1-6 | 1-7 |
| Diamond in topcoat (wt %) | 0.0 | 0.0 | 0.0 | 0.0 | 0.0 | 0.0 | 0.0 |
| Diamond in intermediate coat (wt %) | 0.0 | 0.0 | 0.0 | 0.0 | 0.0 | 0.0 | 0.0 |
| Diamond in primer |  |  |  |  |  |  |  |
| Median particle size (micrometers) | — | 60 | 38 | 29 | 17 | 9 | 1 |
| Loading ratio in dry film (wt %) | 0.0 | 2.9 | 2.9 | 2.9 | 2.9 | 2.9 | 2.9 |
| Loading ratio in dry film (vol %) | 0.0 | 2.0 | 2.0 | 2.0 | 2.0 | 2.0 | 2.0 |
| SBAR wet (cycles) | 3,600 | 4,750 | 14,250 | 8,000 | 6,250 | 5,500 | 3,750 |
| MTP (min/rating) | 165/5 | 420/9 | 280/5 | 255/5 | 195/5 | 190/5 | 190/5 |

Diamond Particles in the Midcoat

Abrasion test results of a 3-coat system with diamond particles in the midcoat are shown in Table 5. The diamond particle size in the midcoat is varied in the range of 1 to 60 micrometers at different loading ratios of 1.6, 3.1 and 6.0 wt % in the dry film. All examples show improved abrasion resistance over the control pan. Superior abrasion resistance is indicated by both SBAR wet and MTP for 38 and 29 micrometer diamond particles in Examples 1-9 and 1-10. Good abrasion resistance is also displayed with greater loading of diamond particles as shown in Examples 1-17 to 1-19.

TABLE 5

Abrasion resistance of 3-coat system with diamond particles in the midcoat

| zebra | Example | | | | | | |
|---|---|---|---|---|---|---|---|
|  | 1-1 (control) | 1-8 | 1-9 | 1-10 | 1-11 | 1-12 | 1-13 |
| Diamond in topcoat (wt %) | 0.0 | 0.0 | 0.0 | 0.0 | 0.0 | 0.0 | 0.0 |
| Diamond in intermediate coat |  |  |  |  |  |  |  |
| Median particle size (micrometers) | — | 60 | 38 | 29 | 17 | 9 | 1 |
| Loading ratio in dry film (wt %) | 0.0 | 3.1 | 3.1 | 3.1 | 3.1 | 3.1 | 3.1 |
| Loading ratio in dry film (vol %) | 0.0 | 2.0 | 2.0 | 2.0 | 2.0 | 2.0 | 2.0 |
| Diamond in primer (wt %) | 0.0 | 0.0 | 0.0 | 0.0 | 0.0 | 0.0 | 0.0 |
| SBAR wet (cycles) | 3,600 | 8,750 | 19,000 | 17,500 | 14,000 | 9,500 | 6,500 |
| MTP (min/rating) | 165/5 | 420/9 | 420/9 | 420/9 | 420/7 | 420/6 | 360/5 |

| zebra | Example | | | | | |
|---|---|---|---|---|---|---|
|  | 1-14 | 1-15 | 1-16 | 1-17 | 1-18 | 1-19 |
| Diamond in topcoat (wt %) | 0.0 | 0.0 | 0.0 | 0.0 | 0.0 | 0.0 |
| Diamond in intermediate coat |  |  |  |  |  |  |
| Median particle size (micrometers) | 38 | 29 | 17 | 38 | 29 | 17 |
| Loading ratio in dry film (wt %) | 1.6 | 1.6 | 1.6 | 6.0 | 6.0 | 6.0 |
| Loading ratio in dry film (wt %) | 1.0 | 1.0 | 1.0 | 4.0 | 4.0 | 4.0 |
| Diamond in primer (wt %) | 0.0 | 0.0 | 0.0 | 0.0 | 0.0 | 0.0 |
| SBAR wet (cycles) | 10,500 | 10,250 | 7,250 | 18,500 | 18,500 | 13,000 |
| MTP (min/rating) | 420/9 | 420/9 | 420/7 | 420/9 | 420/9 | 420/9 |

Diamond Particles in the Overcoat

Abrasion test results of a 3-coat system with diamond particles in the overcoat are shown in Table 6. The diamond particle size in the overcoat is varied in the range of 1 to 60 micrometers at the loading ratio 3.3 wt % in the dry film. High MTP abrasion resistance at 420 min with ratings of 9 is shown in all sizes of the diamond particles with improved SBAR results over the control pan.

ticle size of diamond to be added in midcoat should be determined by considering the diamond particle size to be added in primer and total film thickness of the coating. If particle sizes in both the primer and midcoat are too large with respect to the total film thickness, the diamond particles which extend from the undercoat to the overcoat will be caught in the abrasive pad of the test equipment and pulled out during oscillation, no longer being able to anchor the fluoropolymer coating which

TABLE 6

Abrasion resistance of 3-coat system with diamond particles in the overcoat

|  | Example | | | | | | |
| --- | --- | --- | --- | --- | --- | --- | --- |
|  | 1-1 (control) | 1-20 | 1-21 | 1-22 | 1-23 | 1-24 | 1-25 |
| Diamond in topcoat |  |  |  |  |  |  |  |
| Median particle size (micrometers) | — | 60 | 38 | 29 | 17 | 9 | 1 |
| Loading ratio in dry film (wt %) | 0.0 | 3.3 | 3.3 | 3.3 | 3.3 | 3.3 | 3.3 |
| Loading ratio in dry film (vol %) | 0.0 | 2.0 | 2.0 | 2.0 | 2.0 | 2.0 | 2.0 |
| Diamond in intermediate coat (wt %) | 0.0 | 0.0 | 0.0 | 0.0 | 0.0 | 0.0 | 0.0 |
| Diamond in primer (wt %) | 0.0 | 0.0 | 0.0 | 0.0 | 0.0 | 0.0 | 0.0 |
| SBAR wet (cycles) | 3,600 | 5,000 | 4,750 | 6,750 | 7,750 | 5,700 | 5,250 |
| MTP (min/rating) | 165/5 | 420/9 | 420/9 | 420/9 | 420/9 | 420/9 | 420/9 |

Example 2

Similar to Example 1, a 3-coat non-stick system is sprayed onto test pans of smooth aluminum. The examples presented below show an abrasion resistance of the 3-coat system with varying amounts and sizes of diamond particles in the both midcoat and primer. Test pans are subjected to SBAR (both wet and dry) and MTP to evaluate abrasion resistance.

The results are shown in Table 7. As shown in Examples 2-2 and 2-3, the presence of the diamond particles in the primer in conjunction with the midcoat exhibit much improved SBAR wet and MTP abrasion resistance compared to diamond particles either in the primer or in the midcoat alone as shown in Examples 1-3, 1-10 and 1-11. The value of selecting the proper particle size for the midcoat to optimize the coating system can be seen when comparing Example 2-1 with 38 micrometer particle size to Examples 2-2 to 2-7 having particle sizes of 9, 17, and 29 micrometers. The parconfers release characteristics. Such action simulates what will occur under abrasive use of the coated product.

With 6 wt % loading of diamond particles with 29 micrometers in the midcoat, both SBAR and MTP abrasion resistance are improved as shown in Example 2-5 in comparison with Examples 1-18.

Especially SBAR performance improves about 8 times for wet and about 6 times (163,000 cycles) for dry in comparison with the coating without any diamond particles.

For Example 2-7, diamond particles in the midcoat coat are a blend of three sizes 29, 17, 9 at 3.0, 1.5, 1.5 wt % respectively. Wider particle size distribution by blending of different particle sizes shows less improvement for SBAR abrasion resistance, indicating a preference for a narrow particle size distribution. For this invention, it is preferred to use particles of a single size, rather than blends of particles having different sizes.

TABLE 7

Abrasion resistance of 3-coat system with diamond particles in both primer and midcoat

|  | Example | | | | | | | |
| --- | --- | --- | --- | --- | --- | --- | --- | --- |
|  | 1-1 (control) | 2-1 | 2-2 | 2-3 | 2-4 | 2-5 | 2-6 | 2-7 |
| Diamond in topcoat (wt %) | 0.0 | 0.0 | 0.0 | 0.0 | 0.0 | 0.0 | 0.0 | 0.0 |
| Diamond in intermediate coat |  |  |  |  |  |  |  |  |
| Median particle size (micrometers) | — | 38 | 29 | 17 | 29 | 29 | 17 | 29, 17, 9 |
| Loading ratio in dry film (wt %) | 0.0 | 3.1 | 3.1 | 3.1 | 3.1 | 6.0 | 6.0 | 3.0, 1.5, 1.5 |
| Loading ratio in dry film (vol %) | 0.0 | 2.0 | 2.0 | 2.0 | 2.0 | 4.0 | 4.0 | 2.0, 1.0, 1.0 |
| Diamond in primer |  |  |  |  |  |  |  |  |
| Median particle size (micrometers) | — | 38 | 38 | 38 | 38 | 38 | 38 | 38 |
| Loading ratio in dry film (wt %) | 0.0 | 2.9 | 2.9 | 2.9 | 5.7 | 2.9 | 2.9 | 2.9 |
| Loading ratio in dry film (vol %) | 0.0 | 2.0 | 2.0 | 2.0 | 4.0 | 2.0 | 2.0 | 2.0 |
| SBAR dry (cycles) | 26,900 | — | — | — | — | 163,000 | — | — |
| SBAR wet (cycles) | 3,600 | 9,750 | 21,500 | 20,500 | 21,500 | 28,750 | 17,125 | 19,000 |
| MTP (min/rating) | 165/5 | 420/9 | 420/9 | 420/9 | 420/9 | 420/9 | 420/9 | 420/9 |

Example 3

Similar to Example 1, a 3-coat non-stick system is sprayed onto test pans of smooth aluminum. The examples presented below show an abrasion resistance of the 3-coat system without SiC particles in the primer but with 3.1 wt % diamond particles of different sizes in either primer or midcoat. The aqueous dispersion primer compositions without SiC are listed in Table 8. Test pans are subjected to SBAR wet and MTP to evaluate an abrasion resistance.

TABLE 8

Primer composition without SiC but with diamond particles

| Diamond loading ratio | in dry film wt % | 0.0 | 3.1 |
|---|---|---|---|
|  | in dry film vol % | 0.0 | 2.0 |
| Ingredients |  | wt % |  |
| Carbon black |  | 0.33 | 0.33 |
| Ultramarin blue pigment |  | 1.86 | 1.85 |
| Aluminum oxide |  | 8.61 | 8.55 |
| Silicon carbide |  | 0.00 | 0.00 |
| Diamond particle |  | 0.00 | 0.75 |
| PTFE (solids in aqueous dispersion) |  | 4.43 | 4.39 |
| Amorphous silica |  | 1.00 | 0.99 |
| FEP (solids in aqueous dispersion) |  | 3.04 | 3.01 |
| Polyamide imide polymer |  | 4.91 | 4.87 |
| 4,4'-Methylenedianiline |  | 0.01 | 0.01 |
| Sodium naphthalenesulfonic acid |  | 0.19 | 0.18 |
| Hydroxypropyl cellulose |  | 0.03 | 0.03 |
| Ethoxylated acetylenic diols |  | 0.26 | 0.25 |
| Water |  | 65.98 | 65.48 |
| Triethanolamine |  | 0.01 | 0.01 |
| Octylphenolpolyethoxy surfactant |  | 0.56 | 0.55 |
| Diethylethanolamine |  | 0.69 | 0.69 |
| Triethylamine |  | 1.38 | 1.37 |
| Furfuryl alchohol |  | 3.78 | 3.75 |
| N-Methylpyrrolidone |  | 2.94 | 2.92 |
| Total |  | 100.00 | 100.00 |

No SiC but Diamond Particles in the Primer

Abrasion test results of a 3-coat system without SiC but with diamond particles in the primer are shown in Table 9. The diamond particle size is varied in the range of 1 to 60 micrometers at a constant loading ratio 3.1 wt % in the dry film.

Comparison of SBAR wet and MTP abrasion resistance of Examples 3-1 to 3-3 with Examples 1-2 to 1-7 shows that there is modest improvement with diamond particles of targeted size in the primer with greater improvement of abrasion resistance if ceramic particles of SiC (inorganic film hardener) are also present.

TABLE 9

Abrasion resistance of 3-coat system without SiC but with diamond particles in the primer

|  | Example |  |  |  |
|---|---|---|---|---|
|  | 1-1 (control) | 3-1 | 3-2 | 3-3 |
| Diamond in topcoat (wt %) | 0.0 | 0.0 | 0.0 | 0.0 |
| Diamond in intermediate coat (wt %) | 0.0 | 0.0 | 0.0 | 0.0 |
| Diamond in primer |  |  |  |  |
| Median particle size (micrometers) | — | 60 | 38 | 29 |
| Loading ratio in dry film (wt %) | 0.0 | 3.1 | 3.1 | 3.1 |
| Loading ratio in dry film (vol %) | 0.0 | 2.0 | 2.0 | 2.0 |
| SiC (26 micrometers) in dry primer (wt %) | 18.9 | 0.0 | 0.0 | 0.0 |
| SBAR wet (cycles) | 3,600 | 4,550 | 3,750 | 3,850 |
| MTP (min/rating) | 165/5 | 420/9 | 225/5 | 170/5 |

No SiC in the Primer but Diamond Particles in the Midcoat

Abrasion test results of a 3-coat system without SiC in the primer but with diamond particles in the midcoat are shown in Table 10. The diamond particle size in midcoat is varied in the range of 1 to 60 micrometers at the constant loading ratio 3.1 wt % in the dry film. Comparison of SBAR wet and MTP abrasion resistance of Examples 34 to 3-9 with Examples 1-8 to 1-13 shows the significance of adding diamond particles to the midcoat especially at targeted particle sizes.

TABLE 10

Abrasion resistance of 3-coat system without SiC in the primer but with diamond particles in the midcoat

|  | Example |  |  |  |  |  |
|---|---|---|---|---|---|---|
|  | 3-4 | 3-5 | 3-6 | 3-7 | 3-8 | 3-9 |
| Diamond in topcoat (wt %) | 0.0 | 0.0 | 0.0 | 0.0 | 0.0 | 0.0 |
| Diamond in midcoat |  |  |  |  |  |  |
| Median particle size (micrometers) | 60 | 38 | 29 | 17 | 9 | 1 |
| Loading ratio in dry film (wt %) | 3.1 | 3.1 | 3.1 | 3.1 | 3.1 | 3.1 |
| Loading ratio in dry film (vol %) | 2.0 | 2.0 | 2.0 | 2.0 | 2.0 | 2.0 |
| Diamond in primer (wt %) | 0.0 | 0.0 | 0.0 | 0.0 | 0.0 | 0.0 |
| SiC (26 micrometers) in dry primer (wt %) | 0.0 | 0.0 | 0.0 | 0.0 | 0.0 | 0.0 |
| SBAR wet (cycles) | 3,750 | 16,500 | 16,500 | 9,500 | 3,600 | 3,800 |
| MTP (min/rating) | 420/9 | 420/9 | 420/9 | 420/7 | 420/7 | 175/5 |

Example 4

The Examples presented in Tables 11 and 12 show egg release ratings and loss in dry film thickness against the number of abrasion cycles of the 3-coat system with diamond particles in the midcoat.

The primer composition is the same as shown in Table 1, without the diamond particles. The midcoat composition has 38 micrometer diamond particles with 3.1 wt % in dry film as shown in Table 2. The overcoat composition is as shown in Table 3. The abrasion resistance of the coating and release is evaluated by Mechanical Abrasion and Release test protoclo. Example 4-2 in Table 11 shows that the test pans of this invention with 38 micrometers diamond particles in the midcoat continue to received a rating of good egg release.

As shown Example 4-1 in Table 12, the measured loss in dry film thickness for the coatinng that has no diamond particles in it shows poor abrasion resistance and bare metal is exposed just after 7,000 cycles. In contrast, the coating with diamond particles in the midcoat in Example 4-2 is clear evidence of less film thickness loss from abrasion even after 28,000 cycles. The loss in film thickness as shown in Example 4-2 illustrates that that the hard diamond particles anchor the fluoropolymer coating, thereby resisting abrasion forces. This is the reason why good egg releases last longer for the coating with diamond particles.

TABLE 11

Egg release ratings against the number of abrasion cycles.

| | Example | | | |
|---|---|---|---|---|
| | 4-1 (control) | | 4-2 | |
| | Run 1 | Run 2 | Run 1 | Run 2 |
| Diamond in topcoat (wt %) | 0.0 | | 0.0 | |
| Diamond in midcoat | | | | |
| Median particle size (micrometers) | — | | 38 | |
| Loading ratio in dry film (wt %) | 0.0 | | 3.1 | |
| Diamond in primer | | | | |
| Median particle size (micrometers) | — | | — | |
| Loading ratio in dry film (wt %) | 0.0 | | 0.0 | |
| Abrasion cycles (−) | Egg release (rating) | | | |
| 0 | 4-5 | 4-5 | 4-5 | 4-4 |
| 1000 | 3-5 | 2-3 | 3-4 | 3-4 |
| 2000 | 3-4 | 2-3 | 3-5 | 3-4 |
| 3000 | 3-4 | 3-3 | 3-4 | 3-4 |
| 5000 | 3-4 | 2-2 | 4-4 | 3-4 |
| 7000 | 3-4 | 3-3 | 4-4 | 4-4 |
| 11000 | — | — | 4-4 | 4-4 |
| 17000 | — | — | 4-4 | 3-4 |
| 28000 | — | — | 3-4 | 3-4 |

TABLE 12

Loss in dry film thickness against the number of abrasion cycles

| | Example | | | |
|---|---|---|---|---|
| | 4-1 (control) | | 4-2 | |
| | Run 1 | Run 2 | Run 1 | Run 2 |
| Diamond in topcoat (wt %) | 0.0 | | 0.0 | |
| Diamond in intermediate coat | | | | |
| Median particle size (micrometers) | — | | 38 | |
| Loading ratio in dry film (wt %) | 0.0 | | 3.1 | |
| Diamond in primer | | | | |
| Median particle size (micrometers) | — | | — | |
| Loading ratio in dry film (wt %) | 0.0 | | 0.0 | |
| Abrasion cycles (−) | DFT loss (micrometers) | | | |
| 0 | 0.0 | 0.0 | 0.0 | 0.0 |
| 1000 | −7.3 | −9.5 | −0.6 | 0.0 |
| 2000 | −11.8 | −17.9 | −1.2 | −0.8 |
| 3000 | −14.8 | −20.0 | −1.4 | −1.0 |
| 5000 | −19.2 | −24.4 | −1.4 | −2.5 |
| 7000 | −21.5 | −25.9 | −2.2 | −2.5 |
| 11000 | — | — | −3.4 | −3.4 |
| 17000 | — | — | −3.5 | −3.6 |
| 28000 | — | — | −5.2 | −6.3 |

3-coat systems with diamond particles in the midcoat or in both midcoat and primer as described in Examples 1-9 and 2-5 are evaluated for abrasion resistance under cooking conditions by the Accelerated Cooking with Tiger Paw test and the AIHAT test. A release test is performed with a pan after dry SBAR failure. The results are shown in Table 13. Mar and scratch resistance under cooking conditions are the same or much improved as compared to the coating performance without any diamond particles. As shown in Example 44, good egg release still remains even after 163,000 abrasion cycles at dry SBAR failure.

TABLE 13

Abrasion resistance and release under cooking conditions

| | Example | | |
|---|---|---|---|
| | 1-1 (control) | 4-3 | 4-4 |
| Diamond in topcoat (wt %) | 0.0 | 0.0 | 0.0 |
| Diamond in intermediate coat | | | |
| Median particle size (micrometers) | — | 38 | 29 |
| Loading ratio in dry film (wt %) | 0.0 | 3.1 | 6.0 |
| Diamond in primer | | | |
| Median particle size (micrometers) | — | — | 38 |
| Loading ratio in dry film (wt %) | 0.0 | 0 | 2.9 |
| Accelerated Cooking with TP (cooks/rating) | 100/6, 100/6 | 100/6, 100/6 | 100/6, 100/6 |
| AIHAT (cycles/rating) | 10/6, 10/6, 10/5 | 10/7, 10/7, 10/7 | 10/7, 10/7, 10/7 |
| Egg release after dry SBAR failure | | | |
| Total cycles at failure (cycles) | 26,900 | — | 163,000 |
| Egg release (rating) | 3-3 | — | 3-4 |

What is claimed is:

1. A structure comprising a substrate and a non-stick coating applied to said substrate, said coating comprising an undercoat and an overcoat wherein said undercoat comprises a primer layer and a midcoat layer, said primer layer adhering to said substrate and being free from the presence of ceramic particles of inorganic film hardener having an average particle size of at least 14 micrometers, the primer layer comprising a non-fluoropolymer containing polymer binder, and said midcoat layer having diamond particles therein, and which midcoat diamond particles are present only in the midcoat layer.

2. The structure of claim 1 wherein said overcoat comprises a fluoropolymer.

3. The structure of claim 1 wherein said undercoat further comprises a fluoropolymer.

4. The structure of claim 1, wherein the diamond particles have a median particle size of greater than 1 micrometer.

5. The structure of claim 1, wherein the diamond particles have a median particle size of greater than 10 micrometers.

6. The structure of claim 1, wherein the diamond particles have a median particle size ranges from about 10 to 60 micrometers.

7. The structure of claim 1, wherein the diamond particles have a median particle size ranges from about 15 to 50 micrometers.

8. The structure of claim 1, wherein said undercoat further comprises ceramic particles of inorganic film hardener having an average particle size of less than 10 micrometers, wherein the ceramic particles of said inorganic film hardener have a Knoop hardness of greater than 1200.

9. The structure of claim 8, wherein the ceramic particles of inorganic film hardener comprises silicon carbide particles.

10. A structure comprising a substrate and a non-stick coating applied to the substrate, said coating comprising an undercoat and an overcoat, wherein said undercoat comprises a primer layer and a midcoat layer, the midcoat layer being free from the presence of ceramic particles of inorganic film hardener having an average particle size of at least 14 micrometers, and the overcoat comprises diamond particles, and the primer layer comprises ceramic particles of an inorganic film hardener, wherein the ceramic particles of inorganic film hardener have a Knoop hardness of greater than 1200.

11. The structure of claim 10, wherein the diamond particles have a median particle size of greater than 1 micrometer.

12. The structure of claim 11, wherein the diamond particles have a median particle size ranges from about 1 to 60 micrometers.

\* \* \* \* \*